United States Patent [19]
King et al.

[11] Patent Number: 5,345,761
[45] Date of Patent: Sep. 13, 1994

[54] ENERGY MANAGEMENT SYSTEM FOR HYBRID VEHICLE

[75] Inventors: Edward T. King, Dearborn; Larry R. Brandenburg, Northville; Yitshak I. Henig, Ann Arbor, all of Mich.

[73] Assignee: Ford Motor Company, Dearborn, Mich.

[21] Appl. No.: 160,637

[22] Filed: Dec. 2, 1993

[51] Int. Cl.$^5$ ............................................... F01N 3/00
[52] U.S. Cl. ........................................ 60/274; 60/284; 60/289; 60/300; 60/303; 180/65.3
[58] Field of Search .................. 60/272, 274, 273, 284, 60/289, 300, 303; 123/2, 142.5 R; 180/165, 65.1, 65.2, 65.3, 65.4, 65.8

[56] References Cited
U.S. PATENT DOCUMENTS

| | | | |
|---|---|---|---|
| 2,813,984 | 11/1957 | Dolecki et al. | |
| 3,517,766 | 6/1970 | West et al. | |
| 3,650,345 | 3/1972 | Yardney | 180/65.2 |
| 4,021,677 | 5/1977 | Rosen | 180/65.2 |
| 4,033,133 | 7/1977 | Houseman et al. | 60/300 |
| 4,484,083 | 11/1984 | Jefferies | |
| 4,489,242 | 12/1984 | Worst | 180/65.1 |
| 4,923,025 | 5/1990 | Ellers | |
| 5,149,508 | 9/1992 | Bullock | |
| 5,163,290 | 11/1992 | Kinnear | |
| 5,251,588 | 10/1993 | Tsujii et al. | 123/142.5 R |
| 5,255,733 | 10/1993 | King | 123/142.5 R |
| 5,265,418 | 11/1993 | Smith | 60/300 |

Primary Examiner—Stephen F. Husar
Assistant Examiner—Daniel J. O'Connor
Attorney, Agent, or Firm—Joseph W. Malleck; Roger L. May

[57] ABSTRACT

An energy management system for a hybrid vehicle having wheels drivingly connected to traction motors, which motors are alternatively energized by an internal combustion engine generator or an electrical storage battery. The system comprises an electrical storage battery, a high voltage electrically heated catalyst (300–400 volts) for treating the exhaust gas of the internal combustion engine, a generator driven by the selective operation of the internal combustion engine to energize the traction motors and to sometimes produce electrical energy in excess of that consumed by the traction motors, and a high voltage controller for selectively transferring electrical energy generated by the internal combustion engine generator and the electrical energy produced by the traction motors when driven by the wheels to preferentially the electrically heated catalyst and secondarily to the storage battery. Selection is carried out by an on-board microprocessor as a means for controlling the selection of energy transfer paths to provide transfer in accordance with: (i) the temperature of the electrically heated catalyst, (ii) the temperature of the engine coolant; (iii) the speed of the vehicle; and (iv) the state of charge of the storage battery.

7 Claims, 4 Drawing Sheets

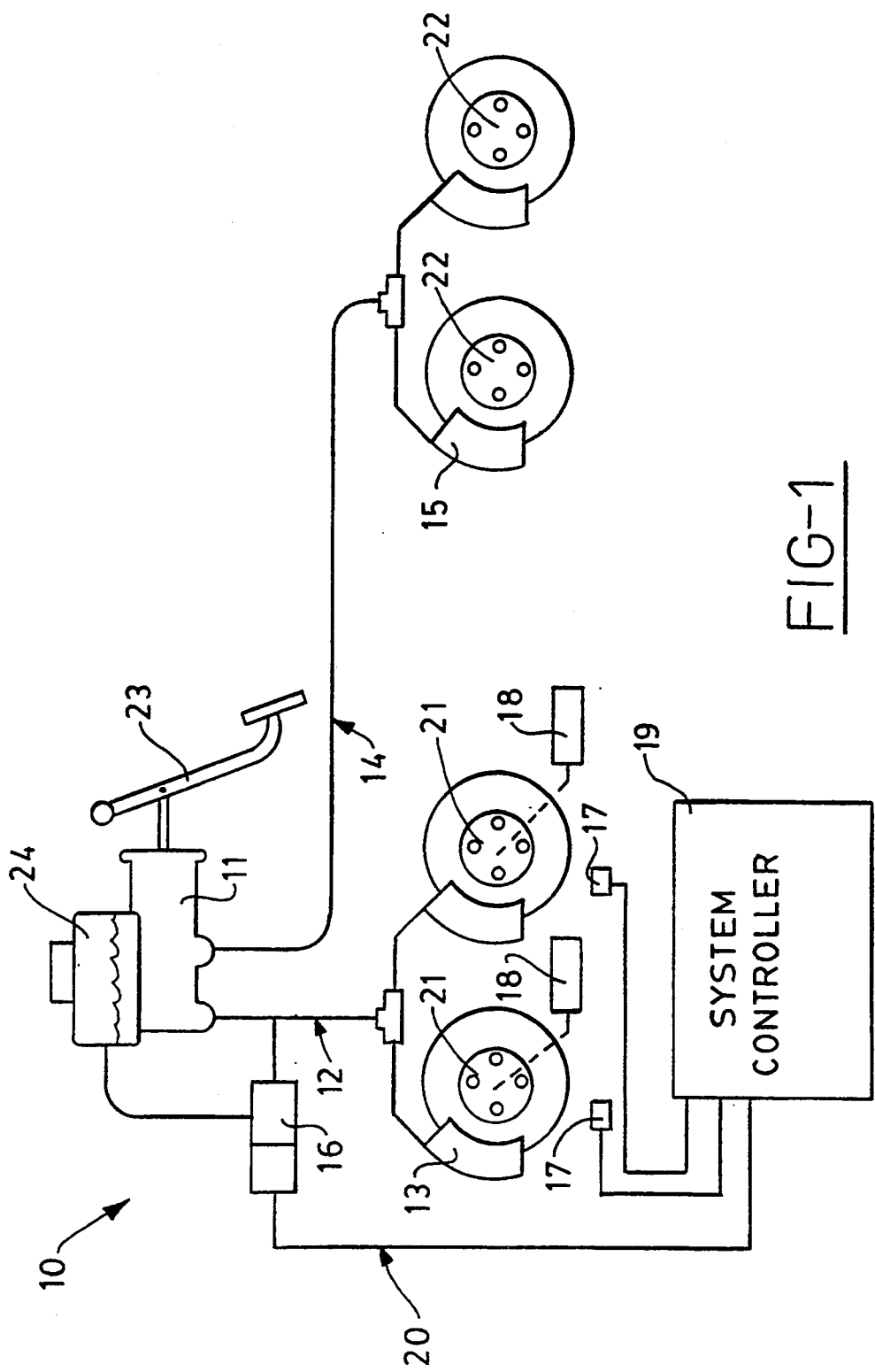

ENERGY MANAGEMENT SYSTEM FOR HYBRID VEHICLE

BACKGROUND OF THE INVENTION

1. Technical Field

This invention relates to hybrid vehicles having alternative power sources such as an electric motor and an internal combustion engine, and more particularly to energy management systems for such vehicles which efficiently uses the available power from such energy sources to drive the vehicle as well as operate subcomponents.

2. Discussion of the Prior Art

Hybrid vehicles generally consist of electric traction motors that drive the wheels, storage batteries for energizing the traction motors, and some type of generator driven by an internal combustion engine as an alternative means of energizing the traction motors. A regenerative braking system is desirable for a hybrid vehicle because it allows the traction motors to function as generators during braking and thereby electrically recover a portion of the vehicle's kinetic energy. During braking, the generators convert the vehicle's kinetic energy into electrical energy rather than dissipate such energy as waste heat as do conventional brakes. Under most operating conditions, this electrical energy is used to recharge the storage batteries. When the battery is at or near a fully charged condition, the regenerative braking system must be deactivated, and the recoverable kinetic energy must be dissipated by the conventional brakes. Whenever regenerative braking is turned off, either automatically (due to a fully recharged battery) or manually, the required brake pedal force and travel exerted by the driver to maintain a specific deceleration rate will be different depending on whether regenerative braking is on or off. This is commonly referred to as a change in brake pedal "feel". Such changes in brake pedal feel are generally considered unacceptable by the driver.

SUMMARY OF THE INVENTION

An object of this invention is to provide an energy management system for a hybrid vehicle that integrates an electrically heated catalyst (EHC) into the high voltage power system. The EHC can make use of regenerative braking energy to consistently maintain the EHC in a prime condition to reduce emissions to an ultra low level from the internal combustion engine when used, and, more importantly, to reduce emissions on cold start of the internal combustion engine when it is started.

The invention, therefore, in a first aspect is an energy management system for a hybrid vehicle, having wheels driven alternatively by an internal combustion engine and one or more traction motors, comprising: (a) a storage battery; (b) a high voltage electrically heated catalyst for treating the exhaust gas of the internal combustion engine; (c) a generator driven by the selective operation of the internal combustion engine; and (d) a high voltage controller for selectively transferring electrical energy generated by the internal combustion engine generator and/or electrical energy produced by the traction motors, when driven by the wheels, preferentially to the electrically heated catalyst and secondarily to the storage battery.

Advantageously, the selection is carried out by an on-board microprocessor as a means for controlling the selection of energy transfer paths to provide transfer in accordance with certain parameters: (i) the temperature of the electrically heated catalyst, (ii) the temperature of the engine coolant; (iii) the speed of the vehicle; and (iv) the state of charge of the storage battery.

The management system may also include an electrically operated air pump connected effectively to inject air into the exhaust stream in advance of the catalyst.

Preferably, the voltage for the electrically heated catalyst, storage batteries, traction motors, and traction motor regenerative mode is in the range of 300–400 volts.

BRIEF DESCRIPTION OF THE DRAWINGS

FIG. 1 is a schematic representation of a regenerative braking system including an operator pedal;

DETAILED DESCRIPTION AND BEST MODE

Figure 2A:
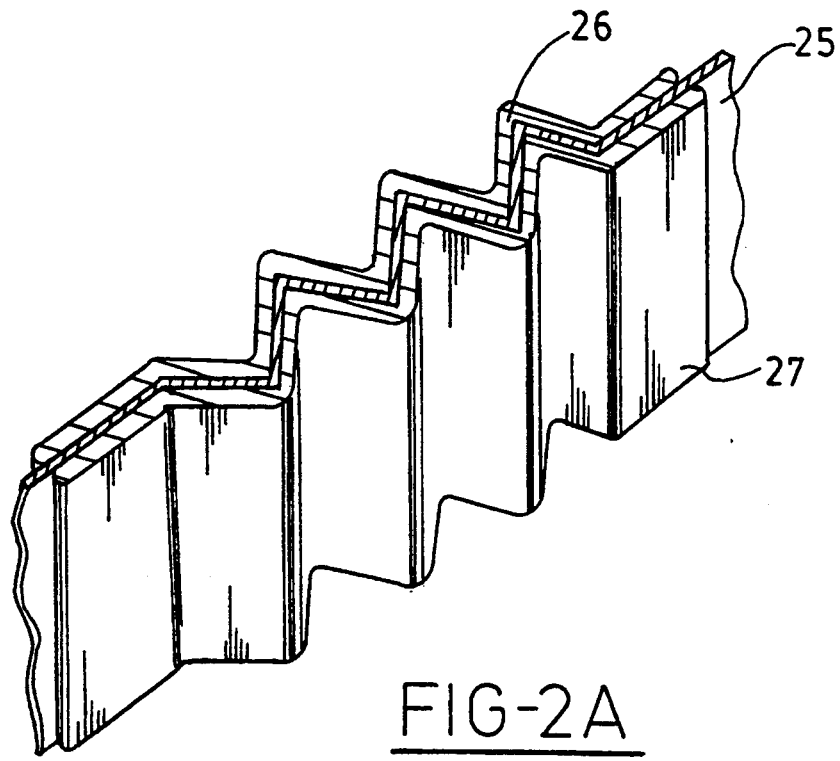
FIG. 2A is an enlarged perspective view of a portion of the resistance foil used in the electrically heated catalyst of this invention.

A hybrid vehicle typically comprises: (i) electric traction motors to drive the wheels of the vehicle or be driven by the wheels to act as a generator; (ii) a device for storing electric power such as a storage battery; (iii) an internal combustion engine powered by the combustion of fuel to drive a generator for alternatively driving the traction motors of the wheels of the vehicle (the generator driven by the internal combustion engine provides electric power to the traction motor or the storage battery). Regenerative braking is used with such a hybrid vehicle because it can cause the traction motors to function as generators during braking.

A regenerative braking system 10 comprises the elements shown in FIG. 1, including: (i) a conventional dual master brake cylinder 11, with a hydraulic circuit 12 supplying hydraulic pressure to both front calipers 13, and a separate circuit 14 feeding the rear calipers 15 (internal expanding drum shoes can also be used); (ii) a pressure venting solenoid 16, controlled by the system controller 19, to vary the pressure of the hydraulic circuit 12 for the brake calipers of the motor driven wheels (60–80% of all vehicle braking is done by the front wheels which provide more regenerative braking energy for recovery than rear wheel regeneration); (iii) a traction motor 18 for at least each pair of driven wheels 21 that produces a voltage during deceleration; and (iv) the system controller 19, responsive to speed sensors 17 and the solenoid venting pressure via line 20, to calculate braking force from the traction motor regenerative mode voltage and current data using an algorithm. The wheel sensors 17 supply vehicle speed data from which a deceleration rate can be calculated. When the brakes are applied by activating pedal 23, the system controller 19 pulses the pressure venting solenoid to bleed off excess hydraulic pressure to the reservoir 24. The amount of pressure bled off is proportional to the calculated braking force applied by the traction motors 18 in the regenerative mode. If the traction motors 18 are doing more braking, the bleed will be greater to reduce pedal effort and stroke. A second algorithm programmed in the controller 19 calculates the first and second derivative of vehicle speed. The first derivative is deceleration, and the second is rate of change of deceleration. If the second derivative exceeds a preset limit, the pulsing frequency of the pressure venting solenoid is modified. This allows a degree of "feedback" closed loop operation, and ensures smoother deceleration similar to that used in an antilock braking system.

The traction motor generator function will convert a portion of the vehicle's kinetic energy into electrical energy rather than dissipate such energy as waste heat as is done by conventional brakes. Under most operating conditions, this electrical energy is used to recharge the storage batteries. Unfortunately, a fully charged battery cannot accept such generator electrical energy from braking. Thus, when the regenerative braking is deactivated, braking energy will be wasted as heat. Not only is this poor energy management, but it results in a different brake pedal feel that is usually unacceptable to a driver.

There is another problem associated with hybrid vehicles that is related to the start-up of the internal combustion engine. Start-up is independent from the initial drive away of the vehicle. The conditions under which the internal combustion engine start-up occurs is usually not optimum. It is well documented that nearly 80% of a conventional internal combustion engine's emissions are generated during cold start-up and drive away. Exhaust catalysts have been used for nearly two decades to attempt to reduce these emissions.

A catalyst, however, is generally ineffective in the conversion of undesirable unburned hydrocarbons (HC) and carbon monoxide (CO) to water and carbon dioxide until the catalyst has reached an activation or "light-off" temperature. This temperature varies with catalyst formulations, but is usually about 600° C. The catalyst depends primarily on the heat of the engine exhaust gas to bring the catalyst up to the activation temperature.

It is only recently that electrically heated catalysts have been developed which are powered by a conventional (non-hybrid) vehicle's electrical system. These electrically heated catalysts are low voltage, 12-volt power supply designs, and provide about 3000–6000 watts. If these catalysts are electrified prior to engine startup, they can be at or above their activation temperature and be fully capable of HC and CO conversion efficiencies greater than 85–90%. Such conversion efficiencies can become available at least one minute sooner than unheated catalysts, and as such are eventually capable of reducing cold start emissions below the levels obtainable with nonpreheated conventional catalysts. The very high current demand, however, associated with low voltage EHC systems, places severe demand on heavy current carrying wires.

In a hybrid vehicle, of course, the high voltage battery, used to power the traction motors, is an excellent source of energy for such an electrically heated catalyst system. The high voltage heating elements of a catalyst for a hybrid vehicle will consist of a conductive substrate 25, usually but not necessarily a corrugated strip of stainless steel foil coated with precious metal catalyst material 26,27 as shown in FIG. 2A. When placed in an electrical circuit as a resistive element, the foil will get hot as current is passed through it. The active catalytic material (usually a platinum/rhodium or palladium/rhodium three-way catalyst formulation), coating the resistive foil, is heated internally by the foil.

The relationship between voltage, current, and resistance that an EHC must obey is known as Ohm's Law. Since the total wattage can be lower in a continuously heated EHC, let's compare what the current and resistance will be in a low voltage EHC and in a high voltage EHC. Since current is equal to power/voltage, then $1200/12=100$ amp for a low voltage system, and $1200/300=4$ amps for a high voltage system. Since resistance is voltage/current, then resistance will be 0.12 ohms for a low voltage system, and 75 ohms for a high voltage system. The higher current and much lower resistance for the low voltage system undesirably demands heavy gauge wiring and switches. Thin resistance foil is usable with a high voltage system, requiring only four amps and needing 75 ohms resistance. However, the resistance (R) of an electrical conductor is directly proportional to its length (L) and inversely proportional to its cross-sectional area (A). An equation representing this relationship is:

$R=\rho$ L/A, where $\rho$ is a constant for a particular material called resistivity. Thin, long foil meets the need for high resistance under this equation.

Figure 2B:
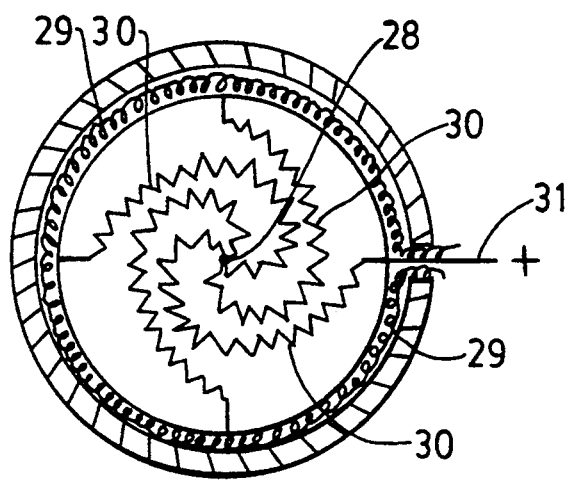
FIG. 2B is a representation of the actual resistance elements rolled into a cylinder for an electrically heated catalyst that is limited by parallel wiring.

The final criteria in designing an electrically heated catalyst is whether the resistive element or elements should be connected in series or parallel. In a series circuit, the total resistance is the sum of the individual resistances. To have a very low R equivalent, as would be required in a low voltage EHC, multiple thick resistors must be connected in parallel to achieve the desired resistance and wattage. They are usually wired as shown in FIG. 2B. The central node 28 is ground (−) and the outer resistance ring 29 is connected to node 28 by radially extending and wrapped resistances 30. The outer ring is connected to a positive node 31.

It has been determined, according to this invention, that an HVEHC, to have a higher resistance, must have the thin resistance foils connected or wired in series. In series, the foil can more easily be wound or layered into shapes other than a circular cylinder demanded of a LVEHC having parallel wiring as in FIG. 2B. The advantages of HVEHC for hybrid vehicles include at least the following: (a) the catalyst can be energized by the existing main traction battery rather than require a larger than normal low voltage (12-volt) battery that operates only vehicle "utility" accessories such as lights, radio, fans, etc.; (b) wiring, switches, and associated electrical hardware are much smaller, lighter, and cheaper because of the greatly reduced operating current; (c) much lower cold-start emissions from the engine; and (d) the HVEHC acts as a resistive load for continuous useful dissipation of regenerative braking energy when the main battery is at or near a fully charged condition.

It is normal for the operator to recharge the vehicle every night to ensure maximum battery energy for the following day's usage. A fully charged battery precludes utilization of regenerative braking. In all regenerative braking systems tested to date, operators experience a change in brake pedal "feel" when the regenerative braking is turned on and off. Most consider that it is unacceptable to the customer. The "feel" can be described as a change in the brake pedal force and travel exerted by the driver to maintain a specific deceleration rate. The change in feel when regenerative braking is turned off is perceived by the operator as a lessening of braking effect. All of the vehicle's braking effect is created by the hydraulic brakes; there is no braking effect contributed by the traction motors in the regenerative mode. The braking effect contributed by regenerative braking can be as high as 50–60% of the total braking effort required to stop the vehicle.

Figure 3:
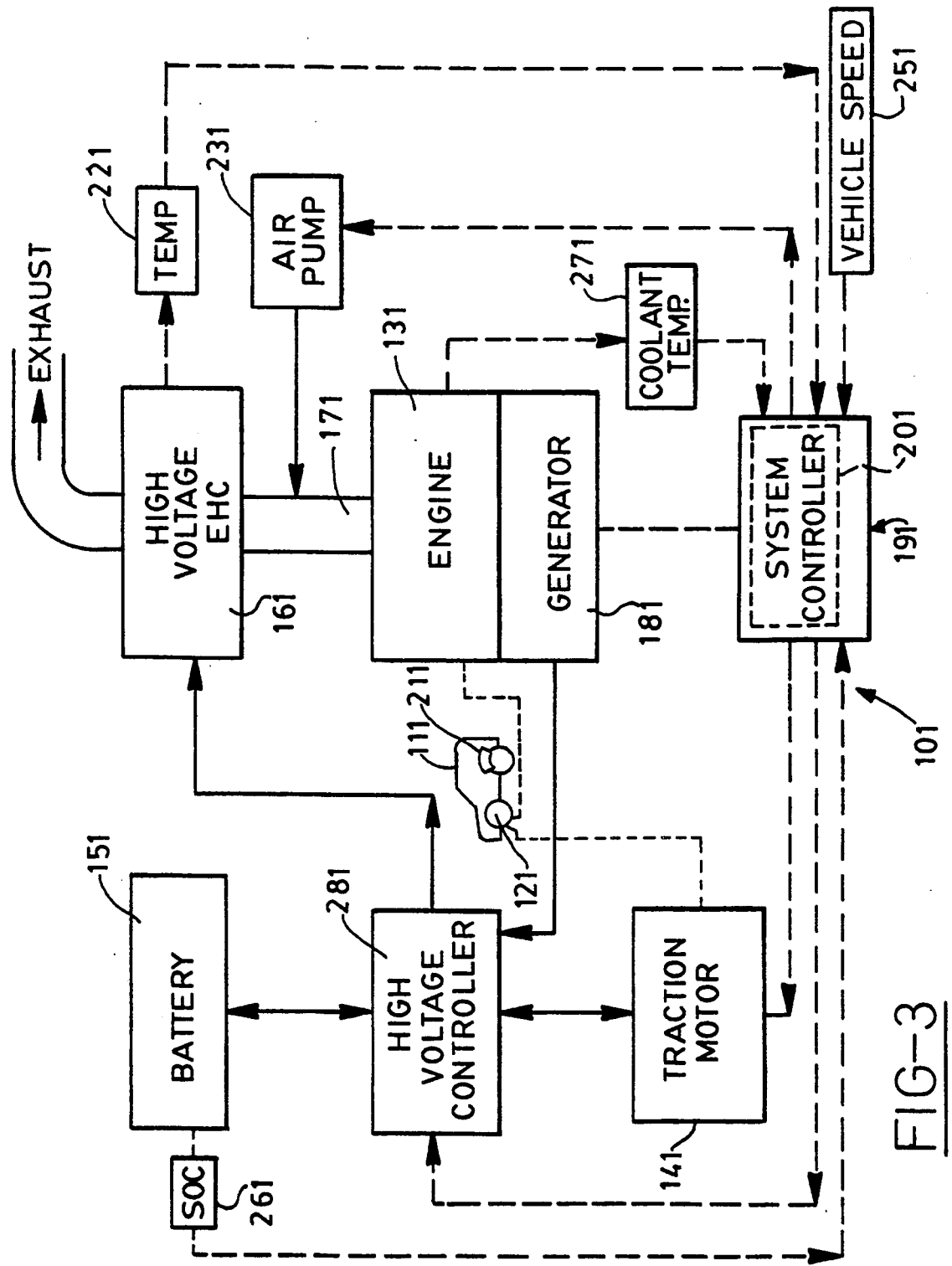
FIG. 3 is a block diagram of the energy management system of this invention.

The invention herein overcomes the dual problems of a lack of brake "feel" when regenerative braking is turned off, and the inability to cope with cold-start emissions in a hybrid vehicle having an internal combustion engine equipped with a conventional heated catalyst. The invention is an energy management system that transfers as much energy as possible to an electrically heated catalytic converter to keep regenerative braking in a consistently active condition until such time as the battery is sufficiently depleted and needs electrical energy to be stored or the system requires start-up of the internal combustion engine and the engine generator can drive the traction motors as well as heat the EHC after a predetermined time interval. The electrically heated catalyst is essentially used as a resistor during operations of the regenerative braking. As shown in FIG. 3, the energy management system 10 for the hybrid vehicle 111 (having wheels 121 driven alternatively by the internal combustion engine 131 or one or more traction motors 141 drivingly connected to wheels) comprises: the storage battery 151, a high voltage electrically heated catalyst 161 for treating the exhaust gas 17 of the internal combustion engine 131, a generator 181 driven by the internal combustion engine 131 which charges the battery 151 when operated, and, most importantly, a system controller 19 for selectively transferring electrical energy produced by the internal combustion engine generator 181 and the electrical energy generated by the traction motors 141 when driven by the wheels 121, to preferentially the electrically heated catalyst 161 and then secondarily to the storage battery 151.

An on-board microprocessor 201 for the controller 191 would determine if the electrically heated catalyst 161 can accept the electrical energy generated by a braking system 211. This would require monitoring of the internal temperature of the electrically heated catalyst by a sensor (thermocouple or thermistor) 221. Air pump 231 is a normal part of the engine's emission system and would supply air during the open-loop cold start mode of the internal combustion engine for optimum catalyst operation. During dissipation of the braking energy, the air pump would be turned on and the internal temperature of the catalyst monitored by sensor 221 to ensure the catalyst is not overheated. The preheating of the catalyst with a functional air pump has two advantages. First, any residual exhaust gases or fuel from a previous engine shutdown would be consumed and purged. Secondly, oxygen replenishment would occur within the precious metals of the catalyst. The oxygen replenishment results when fresh air is blown through the catalyst and a layer of oxygen is stored on the active surface of the catalyst (such as a subcoating of cerium oxide). When the surface of the catalyst is "loaded" in this manner, the catalyst can perform at its optimum efficiency the next time the engine is started.

The microprocessor 201 would continuously provide braking energy to the electrically heated catalyst as long as the internal catalyst temperature conditions allow for it; if not, the energy would then be sent to the battery 151. It is possible to have the microprocessor monitor several other parameters of the vehicle to further optimize the braking energy usage. An algorithm would select the most opportune vehicle deceleration in which to divert the regenerated electrical energy to the electrically heated catalyst by monitoring vehicle speed by a device 251, state of the battery charge by a device 261, and the engine coolant temperature by a gauge 271. The reason for monitoring engine coolant temperature is for controlling other modes of operation of the catalyst air pump. To preclude catalyst and exhaust system overheating in the event of a hot engine shutdown, the air pump would be cycled off and on while monitoring coolant and internal catalyst temperatures. When both of these signals drop below some predetermined value, the air pump would stay off. This performs the additional functions of purging the catalyst of exhaust gas constituents, and oxygen replenishment. The reason for monitoring the state of charge of the battery is to determine if the battery can accept regenerative braking energy. The significant advantage to such algorithm usage within the microprocessor is that the loses involved in diverting the regenerative braking energy into the battery and then drawing it back out of the battery to preheat the catalyst is, in most cases, avoided. The system will be more efficient in that the high power requirements of the electrically heated catalyst can be fulfilled at the higher voltages of the traction motor and battery system.

Existing electric vehicle technology requires two electrical systems in the same vehicle. The high voltage system is primarily for the traction motors and the storage batteries. However, as hybrid vehicles evolve, it will become clear that high power consumption accessories, such as electric heaters, power steering, and air conditioning compressors, will be much more efficient when redesigned for high voltage. A low voltage system (conventional 12-volts) is a carryover from conventional vehicles to operate radios, lighting, and fans. Such a carryover of conventional vehicle electrical hardware is considered essential to keep existing production in operation and costs down on these "generic" automotive accessories. Any needed auxiliary low voltage electrical system can be powered from a high voltage system by use of a voltage-to-voltage converter that changes 300–400 volts DC to 12 VDC. High power consuming accessories that now have to be electric for hybrid vehicle use have to be redesigned; by making them initially high voltage, they will become more efficient. It is desirable to keep the "conventional" accessories on 12 volts, and make the voltage converter only adequate to run these specific accessories.

Figure 4:
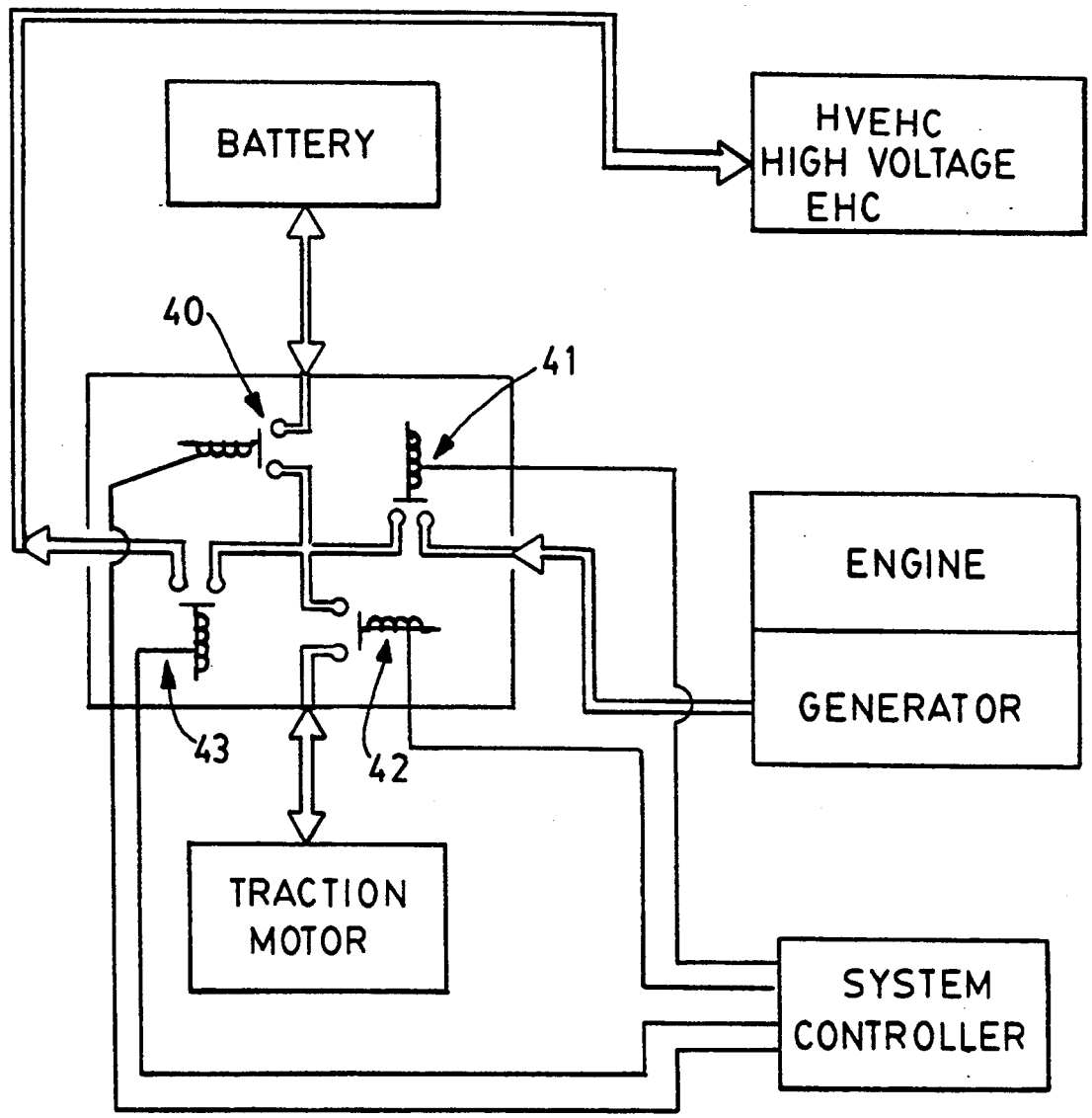
FIG. 4 is a conceptual representation of the high voltage controller used in this invention.

The microprocessor will send signals to a high voltage controller 28 to preferentially transfer the energy of the traction motors to the high voltage electrically heated catalyst 16 and secondarily to the storage battery 15 when the conditions are different. The microprocessor will also send and receive signals to and from the internal combustion engine and generator to control all engine and generator operation and self diagnostics. The high voltage controller can be visualized, as shown in FIG. 4, as having four high voltage-high current solid state (i.e., contactless) relays or MOSFETS 40, 41, 42, and 43. Each of these devices is controlled by a system controller, and by closing the appropriate contacts, the system controller will (i) supply the traction motor 45 with battery and/or generator power; (ii) route regenerative energy from the traction motor to the battery or HVEHC, as appropriate; (iii) isolate the generator when the internal combustion engine is shut off; (iv) route high voltage to HVEHC as required for start-up from the battery or traction motor; (v) route high voltage from the generator to the battery as required; and (vi) isolate all systems from each other as required for safety.

We claim:

1. An energy management system for a hybrid vehicle having wheels drivingly connected to traction motors, which motors are alternatively energized by an internal combustion engine generator or an electrical storage battery, the system comprising:
    (a) an electrical storage battery for energizing said traction motors in a first way;
    (b) an electrically heated catalyst for treating the exhaust gas of the internal combustion engine;
    (c) a generator driven by the selective operation of said internal combustion engine to energize said traction motors in a second way and to sometimes produce electrical energy in excess of that consumed by the traction motors; and
    (d) a controller for selectively transferring said excess electrical energy produced by the internal combustion engine generator and the electrical energy generated by the traction motors when driven by the wheels, to preferentially said electrically heated catalyst and secondarily to said storage battery.

2. The system as in claim 1, in which said electrically heated catalyst is effective to operate at a high voltage.

3. The system as in claim 2, in which said high voltage is in the range of 300-400 volts and said controller additionally contains a high voltage controller for directing the management of the traction motor generated energy to the electrically heated catalyst or the battery at such high voltage levels.

4. The system as in claim 1, in which said controller is effective to transfer said energies on a continuous basis to the electrically heated catalyst except when the internal temperature of said catalyst exceeds a predetermined amount.

5. The system as in claim 4, in which the system additionally contains an air pump for injecting air into the exhaust prior to entrance into the electrically heated catalyst.

6. The system as in claim 1, in which the controller selection is carried out by an on-board microprocessor for selecting the energy transfer path to provide transfer in accordance with: (i) the temperature of the electrically heated catalyst; (ii) the temperature of the engine coolant; (iii) the speed of the vehicle; and (iv) the state of charge of the storage battery.

7. An energy management system for a hybrid vehicle having wheels drivingly connected to one or more traction motors, said traction motors being energized by an internal combustion engine generator or energy received from an electrical storage battery, the system comprising:
    (a) a high voltage electrically heated catalyst for treating the exhaust gas of the internal combustion engine;
    (b) a generator driven by the internal combustion engine when operated to power said traction motors or power any secondary need; and
    (c) a high voltage controller for selectively transferring the electrical energy produced by the internal combustion engine generator and the electrical energy generated by the traction motors when driven by the wheels to preferentially the electrically heated catalyst and thence to the storage battery.

* * * * *